Nov. 24, 1931.　　　E. W. JOHNSON　　　1,833,784
EQUALIZING DEVICE
Filed Feb. 5, 1930　　2 Sheets-Sheet 1

Ernest W. Johnson
INVENTOR
BY Victor J. Evans
ATTORNEY

Nov. 24, 1931.   E. W. JOHNSON   1,833,784
EQUALIZING DEVICE
Filed Feb. 5, 1930   2 Sheets-Sheet 2

Ernest W. Johnson
INVENTOR
BY Victor J. Evans
ATTORNEY

Patented Nov. 24, 1931

1,833,784

UNITED STATES PATENT OFFICE

ERNEST W. JOHNSON, OF STAUNTON, ILLINOIS, ASSIGNOR OF ONE-TENTH TO HENRY HAACKE, ONE-TENTH TO HENRY RUGGERI, ONE-TENTH TO JOHN WILSON, ONE-TENTH TO FRED MEHRKENS, AND ONE-TENTH TO WALTER VOLLMER, ALL OF ST. LOUIS, MISSOURI

EQUALIZING DEVICE

Application filed February 5, 1930. Serial No. 426,149.

This invention relates to devices for equalizing the pull upon a plurality of spaced elements, the invention being especially adapted for equalizing the application of four wheel vehicle brakes.

An object of the present invention is the provision of a device by means of which a pull from a single point will supply power for both the front and rear wheel brakes, means being provided to compensate for differences in adjustment between the brakes of the front wheels, the brakes of the back wheels, as well as for differences in adjustment of connections between the front and rear wheel brakes.

With the above and other objects in view, the invention further includes the following novel features and details of construction to be hereinafter more fully described, illustrated in the accompanying drawings and pointed out in the appended claims.

In the drawings:—

Figure 1:
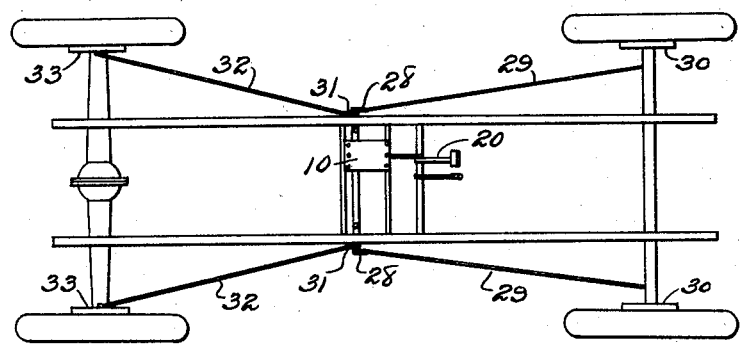
Figure 1 is a plan view showing a portion of the chassis of an automobile with the invention applied.
Figure 2:
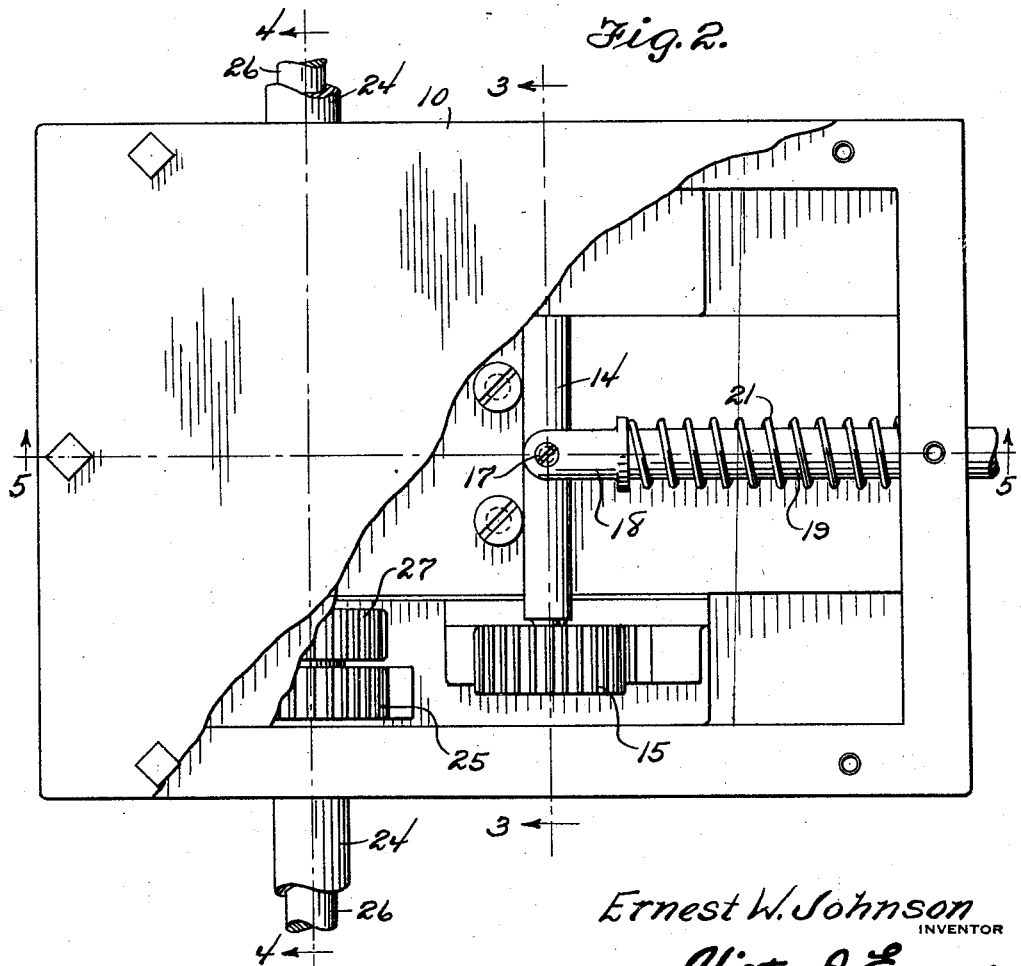
Figure 2 is an enlarged plan view of the invention per se, parts being broken away.
Figure 3:
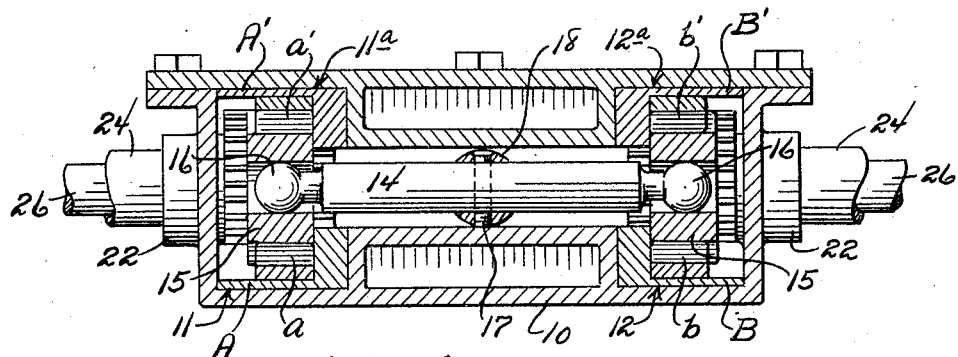
Figure 4:
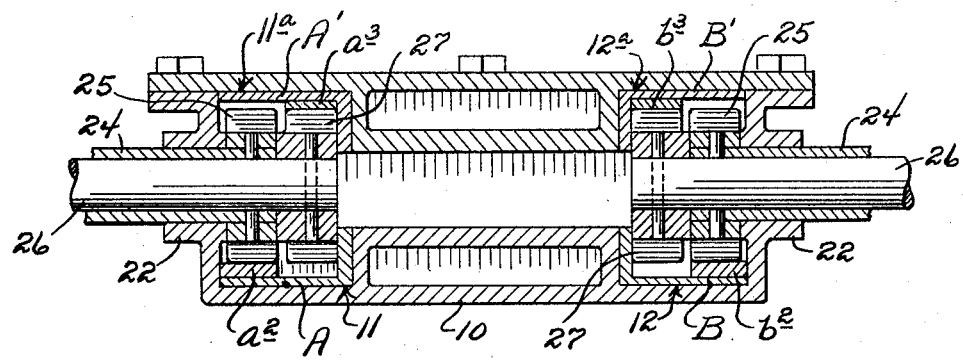
Figure 5:
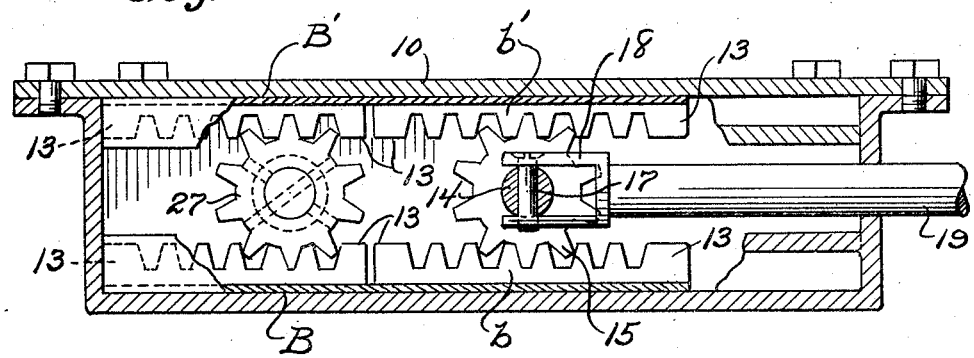

Figures 3, 4 and 5 are sections taken respectively on the lines 3—3, 4—4 and 5—5 of Figure 2.

Referring to the drawings in detail wherein like characters of reference denote corresponding parts, the reference character 10 indicates a casing which is adapted to be secured to the frame of the vehicle in any suitable manner and which encloses the equalizing mechanism constituting the present invention.

The casing 10 has provided along opposite sides upper and lower guide channels 11 and 11a, and 12 and 12a. These channels receive spaced pairs of slides, the slides of one pair being indicated at A and A', while the slides of the other pair are indicated at B and B'. The slide A carries a toothed rack $a$, while the slide A' carries a toothed rack $a'$, these racks being arranged in opposed relation. Likewise, the slide B carries a rack $b$, and the slide B' carries a rack $b'$ which are also arranged in opposed relation.

The slide A carries a rack $a^2$ which is offset with respect to the racks $a$ and $a'$, while the slide A' carries a rack $a^3$ which is offset with respect to the rack $a^2$. The slide B carries a rack $b^2$ which is offset with respect to the racks $b$ and $b'$, while the slide B' carries a rack $b^3$ which is offset from the rack $b^2$. Stops 13 are provided at each end of each of the racks.

Extending transversely within the casing is an equalizing shaft 14. This shaft carries at each end a gear 15, the gear at one end of the shaft engaging the racks $a$ and $a'$, while the gear at the other end of the shaft engages the racks $b$ and $b'$. These gears 15 have a universal connection 16 with the shaft 14, so that the gears may move independently with one gear ahead of the other, or they may move together.

Pivotally secured to the shaft 14 as shown at 17 is a yoke 18. This yoke is carried by a pull rod 19 which extends through the casing and is adapted to be connected to the brake pedal 20 of an automobile or to other suitable actuating means. Outward movement of the rod 19 is yieldingly resisted by a spring 21.

Mounted in bearings 22 which extend from the side of the casing is a hollow shaft or sleeve 24. One of these sleeves extend outwardly at opposite sides of the casing and each sleeve has fast upon its inner end a gear 25. The sleeves 24 provide bearings for shaft 26, secured to the inner ends of these shafts are gears 27.

The outer ends of the shafts 26 carry arms 28 which are connected by rods 29 to the front wheel brakes 30, while the outer ends of the sleeves 24 carry arms 31 which are connected by rods 32 to the rear wheel brakes 33.

The gears 15 are positioned between and engage the racks $a$, $a'$ and the racks $b$, $b'$, while the gears 25 engage the racks $a^2$ and $b^2$. The gears 27 engage the racks $a^3$ and $b^3$ with the racks $a^2$ and $b^2$ engaging the gears 25 opposite the points of engagement of the gears 27 with the racks $a^3$ and $b^3$.

When the foot pedal 20 is depressed, the rod 19 will move outward against the action of the spring 21. The gears 15, thru their engagement with the racks will move all of the slides in the direction of movement of the rod 19. This movement of the slides will, through their engagement with the gears 25 and 27, rotate the shafts 26 and the sleeves 24 in opposite directions to apply the brakes. Should the front wheel brakes take hold before the rear wheel brakes are applied, movement of the gears 27 will stop while the gears 25 will continue to move until the rear wheel brakes are applied. Should the brakes of the wheels upon one side of the vehicle be adjusted unevenly from the brakes of the wheels upon the opposite side, this unevenness of adjustment will be compensated for by the equalizing shaft 14 which permits one of the gears 15 to travel further than the other gear.

The invention is susceptible of various changes in its form, proportions and minor details of construction and the right is herein reserved to make such changes as properly fall within the scope of the appended claims.

Having described the invention what is claimed is:—

1. In an equalizing device, spaced pairs of slidingly mounted members, relatively offset rack bars carried thereby, a floating shaft, a gear at each end of the shaft for engagement with opposed racks of one pair of slidable members, axial aligned shafts, a gear fast upon one end of each of the aligned shafts and engaging one of the racks of one of each pair of slidable members, means at the other end of the aligned shafts for connecting with the members to be equalized, a sleeve rotatable upon each of the aligned shafts, a gear fast upon each sleeve for engagement with a rack of the other slidable member of each pair, whereby movement of the slidable members will rotate the gears of the aligned shafts and sleeves in opposite directions, means at the other ends of the sleeves for engagement with members to be equalized, and spring influenced means adapted for connection with an operating member.

2. In an equalizing device, spaced pairs of slidingly mounted members, relatively offset rack bars carried thereby, a floating shaft, a gear having a universal connection with each end of the shaft for engagement with opposed racks of one pair of slidable members, axial aligned shafts, a gear fast upon one end of each of the aligned shafts and engaging one of the racks of one of each pair of slidable members, means at the other ends of the aligned shafts for connection with members to be equalized, a sleeve rotatable upon each of the aligned shafts, a gear fast upon each sleeve for engagement with a rack of the other slidable member of each pair, whereby movement of the slidable members will rotate the gears of the aligned shafts and sleeves in opposite directions, means at the other ends of the sleeves for engagement with members to be equalized, and spring influenced means adapted for connection with an operating member to move the floating shaft.

3. In an equalizing device for four wheel vehicle brakes, spaced pairs of axial aligned gears, means to connect one gear of each pair with the brakes of the front wheels, means to connect the other gear of each pair with the brakes of the back wheels, a spring influenced floating shaft, means to connect said shaft with an operating member, and means to operatively connect said shaft with the spaced pairs of gears to move the gears of each pair independently and in opposite directions.

4. In an equalizing device for four wheel vehicle brakes, spaced pairs of axial aligned gears, means to connect one gear of each pair with the brakes of the front wheels, means to connect the other gear of each pair with the brakes of the back wheels, a spring influenced floating shaft, means to connect said shaft with an operating member, gears mounted for free universal movement upon opposite ends of the shaft, and means operatively connecting the gears of the floating shaft with the pairs of gears to independently rotate the latter when the floating shaft is moved.

In testimony whereof I affix my signature.

ERNEST W. JOHNSON.